C. H. Franklin.
Vulcanizing Mold.
N° 94,815. Patented Sept. 14, 1869.
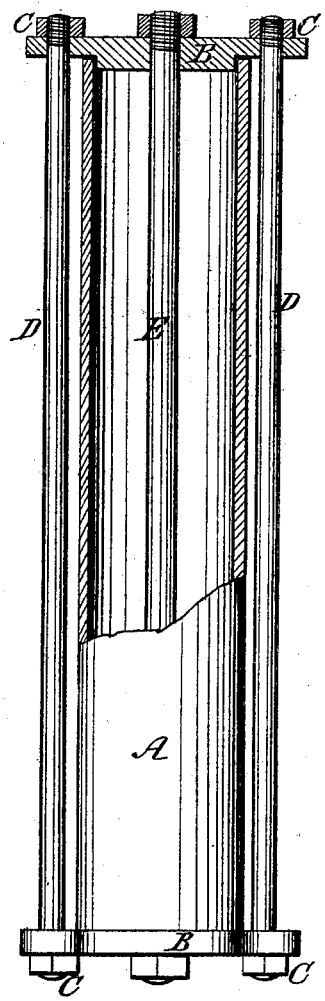
Witnesses.
Alex. F. Roberts.
Frank Plockley
Inventor.
Chas. H. Franklin
per Munn & Co
Attys
N. PETERS, PHOTO-LITHOGRAPHER, WASHINGTON, D. C.

United States Patent Office.

CHARLES H. FRANKLIN, OF JERSEY CITY, NEW JERSEY.

Letters Patent No. 94,815, dated September 14, 1869.

IMPROVED WROUGHT-IRON MOULD FOR VULCANIZING RUBBER CAR-SPRINGS.

The Schedule referred to in these Letters Patent and making part of the same.

*To all whom it may concern:*

Be it known that I, CHARLES H. FRANKLIN, of Jersey City, in the county of Hudson, and State of New Jersey, have invented a new and improved Wrought-Iron Mould for Vulcanizing Rubber Car-Springs, &c.; and I do hereby declare that the following is a full, clear, and exact description thereof, which will enable others skilled in the art to make and use the same, reference being had to the accompanying drawing, forming part of this specification.

The object of this invention is to construct a mould for vulcanizing rubber car-springs, &c., of wrought-iron, it being found in practice to supersede the heavy cast-mould now used in three ways—first, it can be made much lighter and more easy to handle; second, it heats much quicker, the thickness of metal being four-fifths less; and third, it will cool more rapidly, there being less metal to retain the heat, thus enabling the rubber springs or other articles to be vulcanized in less time than has heretofore been accomplished.

The accompanying drawing represents a side view of one of my moulds, part being broke away to show its construction.

Similar letters of reference indicate corresponding parts.

In this case, the letter A represents a wrought-iron cylinder, or tube, of such diameter as may be required.

The heads B B fit in the said cylinder, as shown in the accompanying drawing, and are held tight in their places by the nuts C C on the ends of the rods D D.

The centre rod E, forming the core of the spring, is secured in a similar manner.

Having thus described my invention,

I claim as new, and desire to secure by Letters Patent—

As a new article of manufacture, the wrought-iron cylinder, or tube A, for the purpose herein set forth and described.

The above specification of my invention signed by me, this 2d day of August, 1869.

CHARLES H. FRANKLIN.

Witnesses:
GEO. W. MABEE,
ALFRED LURCOTT.